Feb. 5, 1935. M. NIEDERLE 1,989,999
SOLAR WATER HEATER
Filed June 7, 1933 2 Sheets-Sheet 1
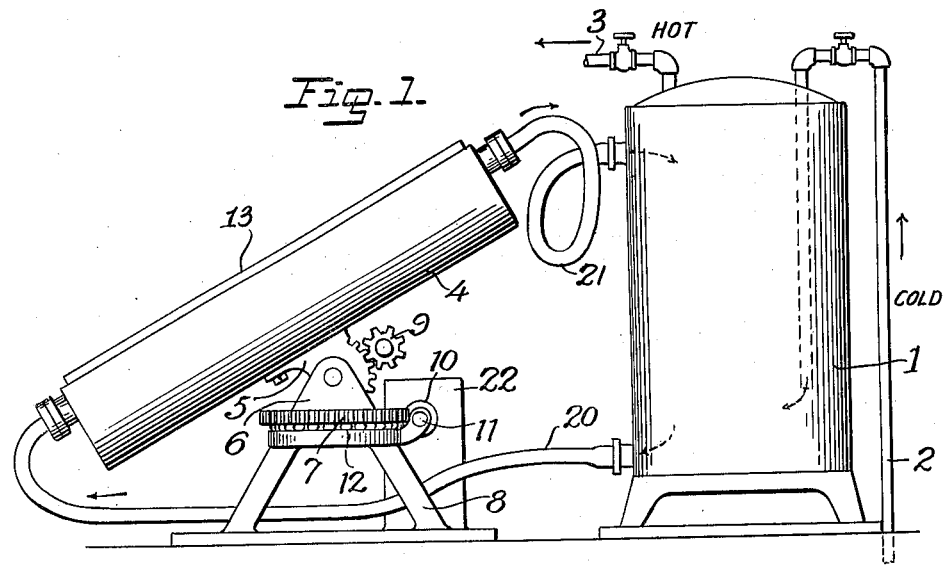
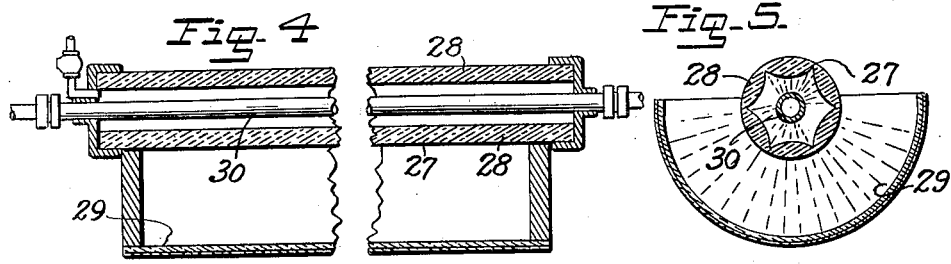
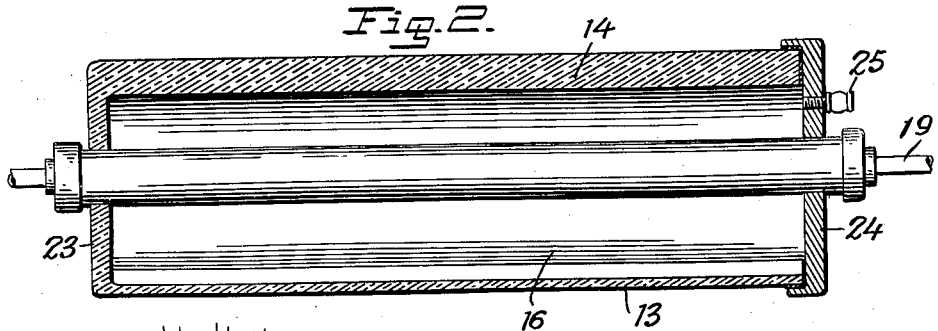
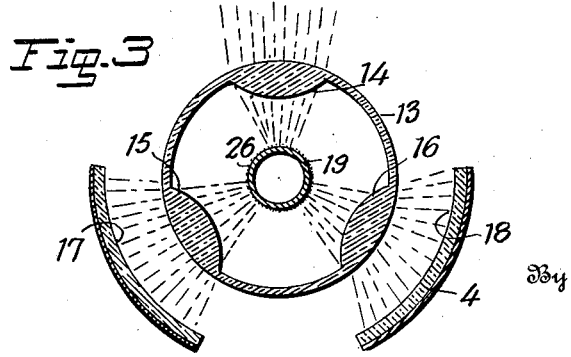
Inventor
Max Niederle,
By Lloyd W. Patch
Attorney

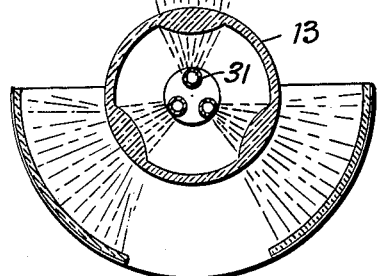
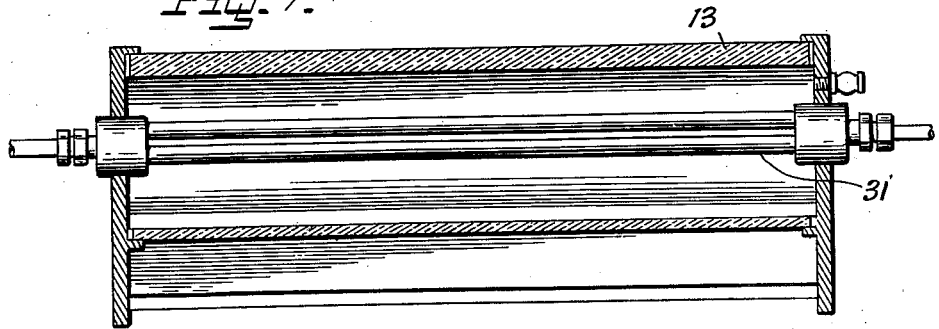
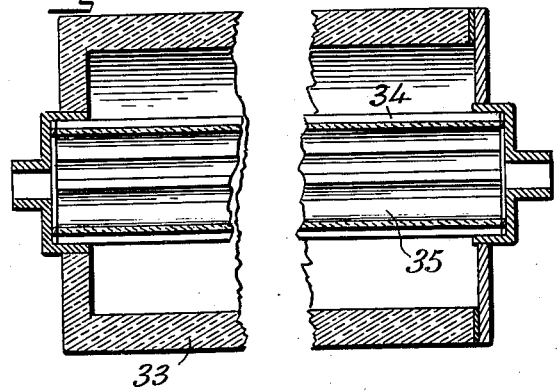
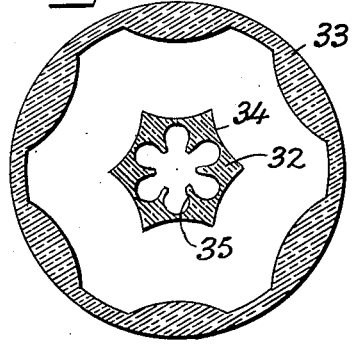
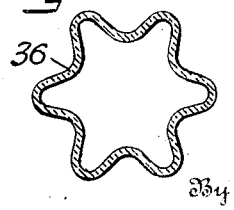

Patented Feb. 5, 1935

1,989,999

UNITED STATES PATENT OFFICE 1,989,999

SOLAR WATER HEATER

Max Niederle, Miami, Fla.

Application June 7, 1933, Serial No. 674,734

5 Claims. (Cl. 126—271)

My invention relates to improvements in solar water heaters, and particularly to a device of this character intended and adapted for use in heating water in a circulating water system.

An object of the invention is to provide a device of this character that can be employed in heating small quantities of water to be withdrawn from the heating unit, or that can be connected in system with a hot water storage tank to automatically circulate and heat water from said tank.

Another object is to so construct the parts making use of the sun's rays and taking the heat therefrom, that the entire installation can be made to be of simple, inexpensive and durable form so that it can be placed in use and can be continuously operated without care or expense, and will operate at all times with maximum efficiency, requiring only that the sun shine with sufficient brilliancy to penetrate and be focused through a lens.

Another object is to provide a concentrating lens arrangement that will collect a maximum of the sun's rays and will concentrate these rays to collect the heat in a manner to accomplish maximum efficiency.

Still another object is to provide a lens and water tube structure in which the lenses, of prismatic form, are associated with a tubular member closing the water tube which tubular member is exhausted to create an ideal condition for penetration of the concentrated light rays to thus give the greatest possible application of heat to the water tube.

Yet another purpose of the invention is to so construct and associate the parts that not only directly projected sun rays are used, but the device will collect and utilize reflected rays to increase the heat application to the water conducting member.

With these and other objects in view, which will be apparent to those skilled in the art, my invention includes certain novel features of construction and combinations of parts that will be hereinafter set forth in connection with the drawings and then pointed out in the claims.

In the drawings:

Figure 1 is a view in side elevation showing one construction and assembly embodying my invention.

Fig. 2 is a longitudinal sectional view through the solar ray collecting apparatus.

Fig. 3 is a transverse sectional view through the parts as shown in Fig. 2.

Fig. 4 is a longitudinal sectional view illustrating another construction of solar ray collecting tube.

Fig. 5 is a transverse sectional view through the construction illustrated in Fig. 4.

Fig. 6 is a transverse sectional view through still another modified form of solar ray collecting, water tube and reflecting apparatus.

Fig. 7 is a longitudinal sectional view through the parts as disclosed in Fig. 6.

Fig. 8 is a fragmentary longitudinal sectional view through yet another form of solar ray collecting and water conducting tube.

Fig. 9 is a transverse sectional view through the parts illustrated in Fig. 8.

Fig. 10 is a transverse sectional view illustrating another form that the water tube can take.

In the adaptation illustrated in Figure 1 I have shown a hot water storage tank 1 having a pipe 2 connected to conduct and supply water thereto, a hot water withdrawal pipe being provided at 3. To all intents and purposes, this hot water storage tank 1 can be of any desired and suitable form and construction, of which many are already known and in use; but, it will perhaps be preferable that the hot water storage tank 1 be insulated or provided with a covering of heat retaining material to thus hold the temperature of the water within the tank at as high a degree as possible and prevent changes with atmospheric temperature changes.

The novelty of the water heating arrangement resides primarily in the manner of collecting both directly emanated and reflected solar rays and in concentrating and projecting the collected rays to accomplish a maximum absorption of heat into water contained within one or more water tubes, which tube or tubes can be of ordinary or special form, as will be hereinafter more fully set forth. Primarily, the collection of maximum usable quantities of the solar rays is accomplished through the use of a tubular member, preferably substantially cylindrical, disposed around the water heating tube and provided with one or more prismatic lenses to focus and concentrate the solar rays in such a manner that the water tube is heated to thus permit absorption of heat by the water. This transmission or projection of the concentrated and focused solar rays is even more efficiently accomplished by exhausting or creating a partial vacuum within the tubular member around the water tube.

Referring particularly to the showing in Figures 1, 2 and 3, a supporting structure 4 is mounted by segmental rack member 5 in suitable trunnion bearings 6 carried by a revoluble table 7, which revoluble table is in turn mounted upon a base support 8. A pinion 9 meshing with the rack portion of segmental member 5 can be turned to vary the longitudinal inclination of the supporting member 4, and a worm gear 10 on a shaft 11 is engaged with worm wheel 12 associated with the turn table 7, so that the entire structure can be turned upon a substantially vertical axis.

The supporting structure 4 has a solar ray collecting tube 13 mounted to extend longitudinally thereon, and in this embodiment the solar ray collecting tube 13 is made as a glass tubular cylinder having portions thickened and convexed inwardly and extending substantially throughout its length at properly spaced points to provide the prismatic elongated lens portions as indicated at 14, 15 and 16. In the present instance I have illustrated the member 13 as provided with three of these elongated prismatic lens portions equally spaced around the circumference of the cylinder, and the tube or cylinder 13 will be mounted in the supporting member to be held, preferably, with one lens portion exposed directly outwardly to direct solar radiation, this mounting disposing the other two elongated prismatic lens portions somewhat inwardly, as perhaps best shown in Fig. 3. Within the supporting structure 4 I provide concentrating reflectors 17 and 18 sufficiently spaced from the tubular cylinder 13 to permit penetration or passage of directly emanated solar rays to be caught by the reflectors 17 and 18 and turned or reflected back to the lens portions 15 and 16. With this arrangement and mounting of the parts, the direct rays of the sun will be caught by lens 14, and direct solar rays caught by reflectors 17 and 18 will be concentrated upon lenses 15 and 16, the effect being that the three lenses 14, 15 and 16 will concentrate the rays and focus upon the water tube 19 extending longitudinally, and substantially, centrally, through the solar ray tube 13.

This water tube 19 is connected at one end by a suitable tube or pipe 20 to receive water from the hot water storage tank 1, and a tube or pipe 21 connects the upper end of the water tube 19 to discharge heated water into the hot water storage tank 1. Of course, where the apparatus is employed without the use of a hot water storage tank, connections can be made in any other suitable manner to accomplish the result desired; and, it will be understood that the connections through tubes 20 and 21 will be made in such manner that movement of the supporting structure 4, and consequently the tubular member 13 and the reflector portions will not be interfered with. This movement is desirable to permit inclination of the solar ray tube to compensate for variations in the position of the sun from day to day, and the movement on the turn table 7 is desirable to permit travel or adjustment of the parts to follow the sun in its travel from sunrise to sunset. While the pinion 9 can be conveniently manually adjusted, it is desirable that some mechanical means be provided to rotate the turn table 7 to cause substantially synchronized adjustment as the sun passes its daily course, and thus maintain most efficient focusing of the concentrated heating rays upon the water pipe or tube 19. Some spring motor, electric motor, or other suitable mechanism, contained in casing 22, or otherwise suitably mounted, may be found desirable to rotate shaft 11 and, through worm 10, accomplish the desired turning movement of the supporting structure 4 to follow the sun. Such mechanisms, synchronized with time calculations, are used in various connections and are well known, in view of which no attempt is here made to fully describe or illustrate any particular embodiment.

While the use of elongated prismatic solar ray focusing lenses arranged in the manner set forth above will focus and concentrate the solar rays in a manner to directly heat the water tube 19, if the focused rays be directed through atmospheric air heat absorption and losses will take place. With this in mind, I close the solar ray tube 13 at its ends, as shown at 23 and 24, preferably hermetically sealing the ends around the water tube 19, and at all other points to be airtight. Then, through the use of a vacuum pump or other suitable apparatus attached to valve outlet 25, I withdraw the air from the interior of the cylinder 13 to create as high a vacuum as is possible and practical. The projected, focused and concentrated solar heating rays from the lenses 14, 15 and 16 will thus be projected to accomplish the most efficient heating of the tube 19, and to heighten this effect and permit a maximum efficiency in absorption of heat into the water passing through tube 19, I paint or otherwise blacken the surface of the water tube 19, preferably upon all portions within the solar ray tube 13, as indicated at 26. The darkened tube surface will take in or absorb heat from the concentrated or focused solar rays projected by the several lenses, and the exhausted interior of the cylinder 13 will not only permit most efficient projection of the focused solar rays, but will hold the heat to guard against external radiation and losses. It may be found desirable to coat or treat the wall portions of the cylinder 13 intermediate the lenses 14, 15 and 16 to provide reflecting mirrors, or in some other way reflect the rays to give maximum heating efficiency at the water tube 19.

As the parts are shown in Figs. 4 and 5, the solar ray collecting cylinder 27 has the wall thereof provided with a plurality of longitudinally extending prismatic lenses 28, and a reflector 29 is disposed in properly spaced relation around substantially the rear half of this cylinder 27. With this arrangement, it may not be necessary to have means for shifting the supporting structure so that the cylinder will follow the course of the sun in its daily travel, as the multiplicity of prismatic lenses 28 will insure a greater number of focal lines within the cylinder 27 as the sun travels across the heavens. The reflector 29 also insures a greater number of reflected rays being concentrated upon the cylinder 27 and through the lenses 28. With such a cylinder 27, the walls will be naturally rather thick and even though the various lenses 28 may not at all times directly focus and concentrate upon the water conducting tube 30, at the nearest point, very efficient results will be attained.

Referring to Figs. 6 and 7, it will be seen that the cylinder 13 and the reflector structure are substantially the same as set forth in connection with Figs. 2 and 3, but in this instance a plurality of water conducting tubes 31 is provided. With this arrangement of water tubes, the individual tubes can be placed to extend substantially along the focal line of each of the lenses and as the individual tubes 31 will carry a relatively small amount and a thin stream of water, these several tubes may serve to give a better water circulating result and to thus accomplish more efficient absorption of heat into the water.

In Figs. 8 and 9 I have illustrated a modification of the adaptation shown in Figs. 4 and 5, and in this instance the water conducting tube 32 is preferably made of cast aluminum, or of other material that will readily absorb the solar ray heat and will transmit this to water passing through the tube. As here shown, the outer surface of the tube 32 is fluted or grooved longitudinally, preferably upon curves coinciding somewhat with variations in the focal lens or focal line of the several lenses 33, as the sun travels in its daily path. With this construction and arrangement, the shifting or moving of the sun will cause travel of the focal light lines as projected through each of the lenses toward the tube 32, and the grooved outer surfaces 34 of this tube will concentrate the focused light line to take heat therefrom. Further, it may be found desirable to provide ribs or vanes 35 inside of the water tube 32 to thus transmit the heat in manner to be better absorbed by water within the tube. Where the outer tube 32 is of cast aluminum, or other material readily transmitting heat and having some bulk or body, the heat will be absorbed and will hold over to maintain more uniform temperature even though cold water be directly circulated through the tube 32.

In Fig. 10 I have disclosed still another modified form of water conducting tube, and here the tube is made with fluted or corrugated side walls 36, the grooves, ribs or corrugations extending longitudinally. This tube might be made of very thin metal to permit more direct passage of the heat, and the curves of the ribs or corrugations can be formed to conform with the travel of the focal point or line in the lenses.

From the foregoing it will be seen that I have provided a solar water heater structure that will give maximum efficiency and will use all available rays, both direct and reflected, that can be concentrated to accomplish the heating of water. The cylinder, having the elongated prismatic lenses associated therewith, can be cast or otherwise made up to be of a single glass tubular member, and the other parts and portions can be inexpensively manufactured and assembled to thus provide a solar water heater of inexpensive and durable construction that can be sold at a low price; and, which when placed in use will operate efficiently without possibility of deterioration of any of the parts and without likelihood of breakage or damage under ordinary conditions of use. In localities where the sun's rays are available throughout any considerable time, my solar water heater can be made of small compact form to be mounted upon a roof, placed outside of a window, or otherwise conveniently located to be directly exposed to the sun, and as full advantage is taken of both direct and reflected solar rays, and the solar rays thus caught are concentrated, focused and transmitted in a manner to impart a maximum heating effect to the water, the structure will prove most efficient in operation.

While I have herein shown and described only one mounting and assembly of the parts for use, and have suggested and illustrated only certain possible modifications and variations in some of the features and portions, it will be appreciated that many changes and variations can be made in the form, construction, arrangement and assembly, and in the manner of mounting and using the structure, without departing from the spirit and scope of my invention.

I claim:

1. A solar water heater comprising, an elongated tubular glass cylinder having a portion thereof thickened convexly inwardly to form a longitudinally extending lens portion, and an elongated water tube disposed within the tubular member to be subjected to solar rays concentrated and focused by said lens.

2. A solar water heater comprising, a tubular member having elongated longitudinally extending lenses carried at spaced points around the periphery thereof, an elongated water tube extending within the tubular member, means to mount said tubular member with one lens exposed to direct solar rays, and reflector means to reflect solar rays through another lens, the water tube being disposed to be subjected to the rays concentrated and focused by said lenses.

3. A solar water heater comprising, a tubular glass cylinder having portions thickened convexly inwardly to provide elongated longitudinally extending lenses at spaced points around the wall of the cylinder, means to mount said cylinder with one of the lens portions thereof exposed to direct solar rays, elongated concentrating reflectors to catch and concentrate solar rays in the other lens portions of the cylinder, said lens portions being all focused to concentrate and focus toward the center of the cylinder on lines parallel with the axis thereof, and a water conducting tubular arrangement in said cylinder extending longitudinally through the middle portion to have the solar rays concentrated and focused thereon, said water conducting tubular arrangement being surfaced to absorb heat and to transmit the heat thus absorbed to water contained therein.

4. A solar water heater comprising, a tubular glass cylinder having portions thickened convexly inwardly to provide elongated longitudinally extending lenses at spaced points around the wall of the cylinder, mean to mount said cylinder with one of the lens portions thereof exposed to direct solar rays, elongated concentrating reflectors to catch and concentrate solar rays in the other lens portions of the cylinder, said lens portions being all focused to concentrate and focus toward the center of the cylinder on lines parallel with the axis thereof, a water conducting tubular arrangement in said cylinder extending longitudinally through the middle portion to have the solar rays concentrated and focused thereon, said water conducting tubular arrangement being surfaced to absorb heat and to transmit the heat thus absorbed to water contained therein, and mean to close said glass cylinder hermetically at its ends to permit exhaustion to remove atmospheric air therefrom.

5. A solar water heater comprising, a tubular glass cylinder having portions thereof thickened convexly inwardly to form elongated longitudinally extending lenses, and an elongated water tube disposed substantially centrally through the cylinder and having its outer walls longitudinally grooved or fluted substantially parallel to the inner surfaces of the lens portions of the glass cylinder.

MAX NIEDERLE.